Patented July 12, 1949

2,475,969

UNITED STATES PATENT OFFICE 2,475,969

OXIDATION OF HETEROCYCLIC AROMATIC NITROGEN COMPOUNDS

Millard Samuel Larrison, West McHenry, Ill., assignor to Allied Chemical & Dye Corporation, New York, N. Y., a corporation of New York No Drawing. Application March 22, 1945, Serial No. 584,263

14 Claims. (Cl. 260—295.5)

This invention relates to the oxidation to pyridine carboxylic acids of heterocyclic aromatic nitrogen compounds having an oxidizable organic grouping attached to the nitrogen-containing aromatic nucleus by one or more carbon-to-carbon linkages; more particularly it relates to the production of nicotinic acid from compounds of the type described.

It has previously been proposed to produce pyridine carboxylic acids such as nicotinic acid by catalytic oxidation of heterocyclic aromatic nitrogen compounds of the type described with sulfuric acid; among the substances which may be employed to catalyze the oxidation are mercury, mercury compounds soluble in sulfuric acid, mixtures of mercury and copper compounds soluble in sulfuric acid, selenium or selenium compounds soluble in sulfuric acid.

It is an object of this invention to provide a process whereby heterocyclic aromatic nitrogen compounds of the type described may be oxidized to pyridine carboxylic acids more rapidly than is possible by the use of sulfuric acid.

It is a more particular object of this invention to provide a continuous process for oxidizing quinoline to nicotinic acid.

In accordance with this invention an N-heteroaryl compound having an oxidizable organic grouping attached to the nitrogen-containing aromatic nucleus by one or more carbon-to-carbon linkages is oxidized to a pyridine carboxylic acid by introducing into a zone maintained at a temperature between about 290° and about 340° C. a mixture of reactants including the N-heteroaryl compound, sulfuric acid, nitric acid, and, preferably, a catalyst, and reacting these substances in said zone to produce a pyridine carboxylic acid, the amount of nitric acid employed, relative to the amount of sulfuric acid, being such that the weight ratio $H_2SO_4:HNO_3$ is between about 3:1 and about 19:1. The admixture of the relatively small amount of nitric acid with the sulfuric acid markedly accelerates oxidation of the N-heteroaryl compound. As a particular embodiment of my invention, I have found that the admixture of the nitric acid with the sulfuric acid permits continuous oxidation of quinoline to nicotinic acid to be readily carried out on an economic basis. Furthermore, I have found that the presence of nitric acid accelerates oxidation of the N-heteroaryl compounds to such an extent that catalysts less active than the catalysts above described, e. g. copper sulfate, may be employed for the oxidation or, if desired, the use of catalysts for the oxidation may be entirely dispensed with.

The term "N-heteroaryl compound" is employed throughout the specification and claims to denote a heterocyclic compound in which one

group of an aromatic nucleus is replaced by a nitrogen atom.

As hereinabove pointed out, my invention is applicable to the oxidation of any N-heteroaryl compound having an oxidizable organic grouping attached to the nitrogen-containing aromatic nucleus by one or more carbon-to-carbon linkages. The nature of the product obtained will vary, depending upon the particular compound oxidized. Thus oxidation of 3-alkyl pyridines, such as 3-picoline or 2,3-lutidine, and oxidation of quinoline, 8-hydroxy quinoline, quinoline-8-sulfonic acid, 5-nitroquinoline, 8-nitroquinoline or nicotine in accordance with this invention yields the highly valuable nicotinic acid. Oxidation of 2-picoline yields picolinic acid, whereas oxidation of 4-picoline gives isonicotinic acid; oxidation of isoquinoline yields cinchomeronic acid. A particular embodiment of my invention involves continuous oxidation of quinoline, nitroquinolines, hydroxyquinolines, quinoline sulfonic acids or amino-quinolines, since I have found that the presence of the nitric acid in the sulfuric acid so accelerates the oxidation of these more easily oxidizable N-heteroaryl compounds that continuous oxidation thereof by the process of my invention is economically feasible.

The sulfuric acid employed in accordance with this invention may be concentrated sulfuric acid containing about 93% $H_2SO_4$ but, if desired, more dilute acid, e. g. 75% $H_2SO_4$, or more concentrated or fuming sulfuric acid may be utilized. The nitric acid employed may contain between about 60 and about 100% by weight $HNO_3$. If desired, mixed acid containing from 80 to 90% $H_2SO_4$ and 10 to 20% $HNO_3$, preferably from 12 to 14% $HNO_3$, may be used. As hereinabove pointed out, the amount of nitric acid used, relative to the amount of sulfuric acid, should be such that the weight ratio $H_2SO_4:HNO_3$ is between about 3:1 and about 19:1, preferably between about 4:1 and about 9:1; it is to be understood this ratio is expressed in terms of anhydrous $H_2SO_4$ and $HNO_3$. The amount of the acid mixture employed for oxidation of the N-heteroaryl compound may vary considerably; preferably the weight of the acid mixture is between about 7 and about 12 times the weight of the N-heteroaryl compound when a picoline is being oxidized and between about 8 and about 12 times the weight of the N-heteroaryl compound when a lutidine, quinoline or a substituted quinoline is being oxidized.

In carrying out the process of my invention, oxidation of the N-heteroaryl compound is preferably accomplished in the presence of a catalyst. If mercury or a mercury compound soluble in sulfuric acid is to be employed, it may be incorporated with the mixture of the N-heteroaryl compound and nitric and sulfuric acids by dissolving therein metallic mercury, mercuric oxide or salts of mercury such as mercuric or mercurous sulfate, mercuric acetate or mercuric nitrate; the addition of a copper compound such as copper sulfate promotes the catalytic activity of the mercury, and, hence, the use of a mixed mercury-copper catalyst, in which the amount of copper varies between 0.01% and 100% of the weight of the mercury, is preferred. The amount of mercury catalyst employed may vary but generally between about 0.04 and 0.1 gram atom of mercury per mol of N-heteroaryl compound is suitable. If a selenium catalyst is to be utilized, selenium, selenium oxychloride, selenium oxybromide, selenium sulfoxide, selenium dioxide and selenic or selenous acids or their salts may be added to the mixture. The amount of the selenium catalyst employed may vary widely but generally between 0.03 and 0.3 gram atom of selenium per mol of N-heteroaryl compound is suitable.

In addition, less active catalysts than those above mentioned, e. g. copper sulfate, may be employed in accordance with the invention. The copper sulfate may be incorporated in the mixture of the N-heteroaryl compound and sulfuric and nitric acids as such or by the addition of copper or a copper compound soluble in sulfuric acid to the mixture. The amount of the copper catalyst employed may desirably vary between about 0.05 and about 0.5 gram atom of copper per mol of N-heteroaryl compound.

In carrying out the process of this invention the N-heteroaryl compound to be oxidized is admixed with the nitric acid and sulfuric acid in the proportions indicated above, a catalyst is then preferably added to the mixture, and the resulting mass is then introduced into a zone maintained at a temperature between about 290° and about 340° C., preferably between about 305° and about 325° C., at a rate such that it is heated rapidly to the temperature of the zone without substantial evaporation of nitric acid. The hot zone to which the mixture is added is preferably composed of a partially oxidized N-heteroaryl compound—nitric acid-sulfuric acid mixture; in carrying out this preferred embodiment of the invention, a body of sulfuric acid is heated to a temperature between about 290° and about 340° C., preferably between about 305° and about 325° C., and addition thereto of the mixture of the N-heteroaryl compound to be oxidized, nitric acid, sulfuric acid and, preferably, a catalyst is commenced at a rate such that the mixture being added to the sulfuric acid is rapidly heated to the temperature of the sulfuric acid without substantial evaporation of nitric acid. However, it is to be understood that the reaction may also be carried out by passing the reaction mixture through a horizontal or vertical reaction vessel, preferably provided with suitable packing, maintained at a temperature between about 290° and about 340° C. or by passing the reaction mixture in the form of a thin film over a surface heated to a temperature within this range; any other means whereby the mixture of the N-heteroaryl compound and nitric and sulfuric acids may be introduced into a zone and rapidly heated to a temperature between about 290° and about 340° C. may also be utilized. When the reaction has been completed, the reaction mass may be permitted to cool and the pyridine carboxylic acid recovered therefrom. If an appreciable amount of N-heteroaryl compound remains unoxidized, as is sometimes the case when picolines are oxidized, the oxidation product may be admixed with additional nitric acid to bring the weight ratio $H_2SO_4:HNO_3$ to between 3:1 and 19:1, and the mixture re-oxidized as described above.

The embodiment of the invention which involves continuous oxidation of the readily oxidizable quinoline or substituted quinolines hereinabove mentioned is preferably carried out by heating a body of sulfuric acid to a temperature between about 290° and about 340° C., preferably between about 305° and about 325° C., and then gradually adding to the hot sulfuric acid a mixture of the quinoline, sulfuric acid, nitric acid and, preferably, a catalyst, the amount of nitric acid employed, relative to the amount of sulfuric acid, being such that the weight ratio $H_2SO_4:HNO_3$ in the reacting mixture is between about 3:1 and about 19:1, preferably between about 4:1 and about 9:1. Addition of the quinoline-acid mixture to the reacting mass may then be continued, nicotinic acid product being continuously withdrawn from the vessel. Continuous oxidation of quinoline or the above-mentioned substituted quinolines may also be carried out by passing a mixture of quinoline or one of the substituted quinolines, sulfuric acid, nitric acid and, preferably, a catalyst, the weight ratio $H_2SO_4:HNO_3$ being between about 3:1 and about 19:1, through a horizontal or vertical tube maintained at a temperature within the ranges specified.

The pyridine carboxylic acid formed in accordance with the procedure of my invention may be recovered in any suitable manner. Thus the acid reaction mixture may be cooled to room temperature and poured into water or ice. The mass may then be partially neutralized with an alkaline material such as ammonia and any water insoluble material removed. If mercury is present in the reaction mixture as a catalyst, it may be removed at this point as mercuric sulfide. The pH value of the solution may then be raised to between 5 and 7 by adding sufficient alkali, or by adding an excess of ammonia thereto and boiling until the solution becomes acid to litmus, and the pyridine carboxylic acid precipitated as a copper salt by reaction with copper sulfate; the copper precipitate may be recovered by filtration and converted by reaction with sodium hydroxide into a sodium salt of the desired pyridine carboxylic acid. The carboxylic acid may then be recovered by acidifying the sodium salt solution and cooling to crystallize the acid. Nicotinic acid is preferably recovered from sodium nicotinate by adding sufficient amounts of an acid such as hydrochloric or sulfuric acid to a sodium nicotinate solution to lower the pH value thereof to between about 3 and about 4, preferably between about 3.4 and about 3.6, and cooling. The carboxylic acid may also be recovered by reacting its copper salt with hydrogen sulfide, separating the copper sulfide thus formed by filtration and recovering the acid from the filtrate.

The following examples are illustrative of my invention; amounts are given in parts by weight;

yield values are based on the N-heteroaryl compound oxidized.

Example 1

92 parts of 93% sulfuric acid were introduced into a reaction vessel and heated to 300° C. Gradual addition to the hot acid of a mixture of 84 parts of 85–90% quinoline, 735 parts of 93% sulfuric acid and 128 parts of 70% nitric acid, containing 2 parts of selenium dioxide dissolved therein, was then commenced at a rate of about 19 parts per minute, the reaction mixture being maintained at about 300° C. About 5 minutes after addition of the above mixture had begun, withdrawal of nicotinic acid product from the bottom of the vessel was started. The nicotinic acid was recovered as copper nicotinate; a yield of 94% was obtained.

Example 2

92 parts of 93% sulfuric acid were introduced into a reaction vessel and heated to 300° C. Gradual addition to the hot acid of a mixture of 42 parts of quinoline, 515 parts of 93% sulfuric acid and 85 parts of 70% nitric acid, containing 1.5 parts of mercuric oxide dissolved therein, was then commenced, the temperature in the vessel being maintained at 305° C. When the mixture had all been added, which required 40 minutes, the reaction mass was cooled and the nicotinic acid recovered as copper nicotinate; a yield of 88.4% was obtained.

Example 3

92 parts of 93% sulfuric acid were introduced into a reaction vessel and heated to about 300° C. Gradual addition to the hot acid of a mixture of 42 parts of quinoline, 423 parts of 93% sulfuric acid and 85 parts of 70% nitric acid, containing 0.25 part of selenium dioxide and 1 part of anhydrous copper sulfate dissolved therein, was then commenced, the temperature of the reaction mass being maintained between 305° and 310° C. When the mixture had all been added, which required 25 minutes, the reaction mass was cooled and nicotinic acid recovered as copper nicotinate; a yield of 94.2% was obtained.

Example 4

92 parts of 93% sulfuric acid were introduced into a reaction vessel and heated to about 300° C. Gradual addition to the hot acid of a mixture of 42 parts of quinoline, 423 parts of 93% sulfuric acid and 85 parts of 70% nitric acid, containing 2 parts of copper sulfate pentahydrate dissolved therein, was then commenced, the temperature being maintained between 305° and 310° C. When the mixture had all been introduced, which required 35 minutes, the reaction mixture was cooled and the nicotinic acid recovered as copper nicotinate; a yield of 88% was obtained.

Example 5

92 parts of 93% sulfuric acid were introduced into a reaction vessel and heated to about 300° C. Gradual addition to the hot acid of a mixture of 42 parts of quinoline, 147 parts of 93% sulfuric acid and 405 parts of mixed nitric-sulfuric acids containing 88% $H_2SO_4$ and 12% $HNO_3$, was then commenced, the temperature being maintained between 306° and 314° C. When the mixture had all been added, which required 53 minutes, the reaction mass was cooled and the nicotinic acid recovered as copper nicotinate; a yield of 92.2% was obtained.

Example 6

92 parts of 93% sulfuric acid were introduced into a reaction vessel and heated to 300° C. A mixture containing 26 parts of mixed nitroquinolines and 184 parts of mixed nitric-sulfuric acids containing 88% $H_2SO_4$ and 12% $HNO_3$ was then gradually added to the hot sulfuric acid over a period of 25 minutes, the temperature being maintained at 310° C. Nicotinic acid was recovered as copper nicotinate; a yield of 94% was obtained.

Example 7

92 parts of 93% sulfuric acid were introduced into a reaction vessel and heated to a temperature between 306° and 311° C. A mixture containing 70 parts of quinoline-8-sulfonic acid and 442 parts of mixed nitric-sulfuric acids containing 88% $H_2SO_4$ and 12% $HNO_3$, in which 3 parts of copper sulfate pentahydrate had been dissolved, was then gradually added to the hot sulfuric acid over a period of 54 minutes, the temperature being maintained between 306° and 311° C. Nicotinic acid was recovered as copper nicotinate; a yield of 86% was obtained.

Example 8

92 parts of 93% sulfuric acid were introduced into a reaction vessel and heated to a temperature between 300° and 310° C. A mixture containing 84 parts of beta-picoline, 220 parts of 93% sulfuric acid and 128 parts of 70% nitric acid, in which 2 parts of selenium dioxide had been dissolved, was then gradually added to the hot sulfuric acid over a period of 55 minutes, the temperature being maintained between 300° and 310° C. The nicotinic acid was recovered as copper nicotinate; a yield of 37.6% was obtained.

Example 9

92 parts of 93% sulfuric acid were introduced into a reaction vessel and heated to a temperature between 307° and 320° C. A mixture of 84 parts of beta-picoline and 405 parts of mixed nitric-sulfuric acids containing 88% $H_2SO_4$ and 12% $HNO_3$, in which 3 parts of copper sulfate pentahydrate had been dissolved, was then gradually added to the hot sulfuric acid over a period of 34 minutes, the temperature being maintained between 307° and 320° C. When all the mixture had been added, the mass was permitted to cool and 85 parts of 70% nitric acid was added thereto. This mixture was then gradually added to 92 parts of 93% sulfuric acid heated to a temperature of 300° to 317° C. over a period of 48 minutes; at the end of this time the reaction mass was permitted to cool and 85 additional parts of 70% nitric acid were added thereto. This mixture was then gradually added to 92 parts of 93% sulfuric acid heated to a temperature of 308° to 318° C. over a period of 35 minutes. At the end of this time the oxidation mass was permitted to cool. Nicotinic acid was recovered as copper nicotinate; a yield of 65% was obtained.

Since certain changes may be made in carrying out the above process without departing from the scope of the invention, it is intended that all matter contained in the above description shall be interpreted as illustrative and not in a limiting sense.

I claim:

1. A process for the oxidation to a pyridine carboxylic acid of an N-heteroaryl compound containing a pyridine nucleus and having an oxidizable organic grouping attached to the nitrogen containing aromatic nucleus by at least one carbon-to-carbon linkage, which comprises introducing into a zone maintained at a temperature between about 290° and about 340° C. a mixture of reactants including the N-heteroaryl compound, sulfuric acid and nitric acid, and reacting these substances in said zone for a period of not more than about one hour to produce a pyridine carboxylic acid, the amount of nitric and sulfuric acids employed being such that the weight ratio $H_2SO_4:HNO_3$ is between about 3:1 and about 19:1.

2. A process for the oxidation to a pyridine carboxylic acid of an N-heteroaryl compound containing a pyridine nucleus and having an oxidizable organic grouping attached to the nitrogen containing aromatic nucleus by at least one carbon-to-carbon linkage, which comprises introducing into a zone maintained at a temperature between about 290° and about 340° C. a mixture containing the N-heteroaryl compound, sulfuric acid, nitric acid and a catalyst, the mixture being introduced into the heated zone at a rate such that substantial evaporation of nitric acid is avoided and the amount of nitric and sulfuric acids employed being such that the weight ratio $H_2SO_4:HNO_3$ is between about 3:1 and about 19:1, thereby producing a pyridine carboxylic acid.

3. A process for the oxidation to a pyridine carboxylic acid of an N-heteroaryl compound containing a pyridine nucleus and having an oxidizable organic grouping attached to the nitrogen containing aromatic nucleus by at least one carbon-to-carbon linkage, which comprises introducing into a zone containing a partially oxidized N-heteroaryl compound-sulfuric acid-nitric acid reaction mixture, said zone being maintained at a temperature between about 290° and about 340° C., a mixture containing the N-heteroaryl compound, sulfuric acid and nitric acid, the mixture being introduced into the heated zone at a rate such that substantial evaporation of nitric acid is avoided the reaction being substantially complete in a period of not more than about one hour and the amount of nitric and sulfuric acids employed being such that the weight ratio $H_2SO_4:HNO_3$ is between about 3:1 and about 19:1, and recovering the pyridine carboxylic acid produced.

4. A process for the oxidation to a pyridine carboxylic acid of an N-heteroaryl compound containing a pyridine nucleus and having an oxidizable organic grouping attached to the nitrogen containing aromatic nucleus by at least one carbon-to-carbon linkage, which comprises introducing into a zone maintained at a temperature of between about 290° C. and about 340° C. a mixture containing the N-heteroaryl compound, sulfuric acid, nitric acid, and a catalyst, the mixture being introduced into the heated zone at a rate such that substantial evaporation of the nitric acid is avoided, the reaction being substantially complete in a period of not more than about one hour and the amount of nitric and sulfuric acids employed being such that the weight ratio $H_2SO_4:HNO_3$ is between about 3:1 and about 19:1, thereby producing a pyridine carboxylic acid.

5. A process for the oxidation to a pyridine carboxylic acid of an N-heteroaryl compound containing a pyridine nucleus and having an oxidizable organic grouping attached to the nitrogen-containing aromatic nucleus by at least one carbon-to-carbon linkage, which comprises introducing a mixture containing the N-heteroaryl compound, sulfuric acid, nitric acid and a dissolved selenium compound into a zone maintained at a temperature between about 290° C. and about 340° C., the mixture being introduced into the hot zone at a rate such that substantial evaporation of nitric acid is avoided, the reaction being substantially complete in a period of not more than about one hour and the amount of nitric and sulfuric acids employed being such that the weight ratio $H_2SO_4:HNO_3$ is between 3:1 and about 19:1, thereby producing a pyridine carboxylic acid.

6. A process for the oxidation to a pyridine carboxylic acid of an N-heteroaryl compound containing a pyridine nucleus and having an oxidizable organic grouping attached to the nitrogen-containing aromatic nucleus by at least one carbon-to-carbon linkage which comprises introducing a mixture of an N-heteroaryl compound, sulfuric acid, nitric acid and a selenium compound catalyst into a zone containing a partially reacted N-heteroaryl compound-sulfuric acid-nitric acid reaction mixture maintained at a temperature between about 290° C. and about 340° C., the mixture being introduced into the hot zone at a rate such that substantial evaporation of nitric acid is avoided, the reaction being substantially complete in a period of not more than about one hour and the amount of sulfuric and nitric acids employed being such that the weight ratio $H_2SO_4:HNO_3$ is between about 3:1 and about 19:1, thereby producing a pyridine carboxylic acid.

7. A process for the oxidation of quinoline to nicotinic acid, which comprises introducing into a zone maintained at a temperature between about 290° and about 340° C. a mixture containing quinoline, sulfuric acid and nitric acid, the mixture being introduced into the heated zone at a rate such that substantial evaporation of nitric acid is avoided the reaction being substantially complete in a period of not more than about one hour and the amount of nitric and sulfuric acids employed being such that the weight ratio $H_2SO_4:HNO_3$ is between about 3:1 and about 19:1, and recovering nicotinic acid from the reaction product.

8. A process for the oxidation of quinoline to nicotinic acid, which comprises introducing a mixture containing quinoline, sulfuric acid, nitric acid and a dissolved selenium compound into a body of sulfuric acid maintained at a temperature between about 290° and about 340° C., the mixture being introduced into the hot acid at a rate such that substantial evaporation of nitric acid is avoided the reaction being substantially complete in a period of not more than about one hour, and the amount of nitric and sulfuric acids employed being such that the weight ratio $H_2SO_4:HNO_3$ is between about 3:1 and about 19:1, and recovering nicotinic acid from the reaction product.

9. A process for the oxidation to nicotinic acid of a mono nitro-quinoline having the nitro group on the benzene ring in a position alpha to one of the two fused carbon atoms of the quinoline molecule, which comprises continuously introducing a mixture containing the said mononitroquinoline, sulfuric acid and nitric acid into a zone maintained at a temperature between about 290° C. and about 340° C., the mixture being introduced into the hot zone at a rate such that substantial evaporation of nitric acid is avoided and the amount of nitric and sulfuric acids employed being such that the weight ratio $H_2SO_4:HNO_3$ is between about 3:1 and about 19:1, and continuously withdrawing nicotinic acid product from the reaction zone.

10. A process for the oxidation of quinoline to nicotinic acid, which comprises continuously introducing a mixture of quinoline, sulfuric acid, nitric acid and a dissolved selenium compound into a zone containing a partially oxidized quinoline-sulfuric acid-nitric acid reaction mixture maintained at a temperature between about 290° and about 340° C., the mixture being introduced into the hot zone at a rate such that substantial evaporation of nitric acid is avoided, and the amount of nitric and sulfuric acids employed being such that the weight ratio $H_2SO_4:HNO_3$ is between about 3:1 and about 19:1, and continuously withdrawing nicotinic acid product from the reaction zone.

11. A process for the oxidation of quinoline to nicotinic acid, which comprises introducing a mixture containing quinoline, sulfuric acid, nitric acid and a dissolved selenium compound into a body of sulfuric acid maintained at a temperature between about 290° and about 340° C., the mixture being introduced into the hot acid at a rate such that substantial evaporation of nitric acid is avoided and the amount of nitric and sulfuric acids employed being such that the weight ratio $H_2SO_4:HNO_3$ is between about 3:1 and about 19:1, continuing introduction of such mixture into the reaction zone and continuously withdrawing nicotinic acid product from the reaction zone.

12. A process for the continuous conversion of quinoline to nicotinic acid which comprises admixing quinoline, sulfuric acid and nitric acid, continuously introducing the resulting mixture into a zone maintained at a temperature between about 290° C. and about 340° C., the mixture being introduced into the hot zone at a rate such that substantial evaporation of nitric acid is avoided, and the amount of nitric and sulfuric acids employed being such that the weight ratio $H_2SO_4:HNO_3$ is between about 3:1 and about 19:1, and continuously withdrawing nicotinic acid product from the reaction zone.

13. A process for the continuous conversion of quinoline to nicotinic acid which comprises admixing quinoline, sulfuric acid, nitric acid and a catalyst, continuously introducing the resulting mixture into a zone maintained at a temperature between about 290° C. and about 340° C., the mixture being introduced into the hot zone at a rate such that substantial evaporation of nitric acid is avoided, and the amount of nitric and sulfuric acids employed being such that the weight ratio $H_2SO_4:HNO_3$ is between about 3:1 and about 19:1, reacting these substances in said zone for a period of not more than about one hour and continuously withdrawing nicotinic acid product from the reaction zone.

14. A process for the continuous conversion of quinoline to nicotinic acid which comprises admixing quinoline, sulfuric acid, nitric acid and a dissolved selenium compound, continuously introducing the resulting mixture into a zone maintained at a temperature between about 290° C. and about 340° C., the mixture being introduced into the hot zone at a rate such that substantial evaporation of nitric acid is avoided, and the amount of nitric and sulfuric acids employed being such that the weight ratio $H_2SO_4:HNO_3$ is between about 3:1 and about 19:1, reacting these substances in said reaction zone for a period of not more than about one hour and continuously withdrawing nicotinic acid product from the reaction zone.

MILLARD SAMUEL LARRISON.

No references cited.